(12) United States Patent
Kaizerman

(10) Patent No.: US 10,896,574 B2
(45) Date of Patent: Jan. 19, 2021

(54) SYSTEM AND METHOD FOR OUTLIER DETECTION IN GAMING

(71) Applicant: Playtika Ltd., Hertsliya (IL)

(72) Inventor: Idan Kaizerman, Meitar (IL)

(73) Assignee: PLAYTIKA LTD, Hertsliya (IL)

(*) Notice: Subject to any disclaimer, the term of this patent is extended or adjusted under 35 U.S.C. 154(b) by 131 days.

(21) Appl. No.: 16/236,929

(22) Filed: Dec. 31, 2018

(65) Prior Publication Data

US 2020/0211325 A1 Jul. 2, 2020

(51) Int. Cl.
| | | |
|---|---|---|
| G07F 17/32 | (2006.01) | |
| G06N 7/00 | (2006.01) | |
| G06Q 30/00 | (2012.01) | |
| G06F 16/2458 | (2019.01) | |
| G06N 20/00 | (2019.01) | |

(Continued)

(52) U.S. Cl.
CPC ......... *G07F 17/3241* (2013.01); *A63F 13/75* (2014.09); *G06F 16/2477* (2019.01); *G06N 7/005* (2013.01); *G06N 20/00* (2019.01); *G06Q 30/0185* (2013.01); *A63F 13/70* (2014.09)

(58) Field of Classification Search
CPC ...... G07F 17/3241; A63F 13/75; A63F 13/70; G06B 7/005; G06Q 30/0185; G06F 16/2477; G06N 20/00
See application file for complete search history.

(56) References Cited

U.S. PATENT DOCUMENTS

| | | | |
|---|---|---|---|
| 10,459,827 | B1 * | 10/2019 | Aghdaie ............. G06F 11/0766 |
| 2008/0305869 | A1 | 12/2008 | Konforty et al. |
| 2011/0213716 | A1 | 9/2011 | Ocko |

(Continued)

FOREIGN PATENT DOCUMENTS

| | | |
|---|---|---|
| CN | 107158707 | 9/2017 |
| WO | WO 2006/036100 | 4/2006 |
| WO | WO 2014/194682 | 12/2014 |

OTHER PUBLICATIONS

Nguyen et al, "Unsupervised Anomaly Detection in Online Game", SoICT 2015, Proceedings of the sixth International Symposium on Information and Communication Technology, Dec. 3, 2015, pp. 4-10. ACM.

(Continued)

*Primary Examiner* — Jasson H Yoo
(74) *Attorney, Agent, or Firm* — Pearl Cohen Zedek Latzer Baratz LLP

(57) ABSTRACT

A system and method for detecting anomalies in gaming patterns, including: obtaining a time series data related to events; extracting event features of the events; calculating a normalized density estimation for each of the events; assigning outlier probability for each of the events based on the normalized density estimation; determining that an event is an outlier event if the outlier probability of the event is above an outlier threshold; calculating, for each window of the time series data, a set of window features based on the outlier events in the window; modeling the window features by a generative model; assigning outlier confidence value for each of the suspected windows based on the distribution of the window features relatively to the generative model; and determining that a window is a suspected window if the outlier confidence value of the window is above a confidence threshold.

20 Claims, 10 Drawing Sheets

(51) Int. Cl.
*A63F 13/75* (2014.01)
*A63F 13/70* (2014.01)

(56) References Cited

U.S. PATENT DOCUMENTS

| | | |
|---|---|---|
| 2011/0295672 A1 | 12/2011 | Dimitriadis et al. |
| 2017/0236370 A1 | 8/2017 | Wang |
| 2018/0324199 A1 | 11/2018 | Crotinger et al. |
| 2019/0095300 A1* | 3/2019 | Oba .................. G06F 11/2257 |
| 2020/0143632 A1* | 5/2020 | Balgooyen .......... G07F 17/3244 |

OTHER PUBLICATIONS

Wang et al, "A Self-Learning and Online Algorithm for Time Series Anomaly Detection, with Application in CPU Manufacturing", 2016, Proceedings of the 25th ACM International Conference on Information and Knowledge Management, Oct. 24, 2016, pp. 1823-1832. ACM.

Christou et al, "Detecting fraud in online games of chance and lotteries", Expert Systems with Applications Sep. 15, 2011, vol. 38, No. 10, pp. 13158-13169. Elsevier.

Alayed et al, "Behavioral-Based Cheating Detection in Online First Person Shooters using Machine Learning Techniques", 2013, IEEE conference on Computational Intelligence in Games (CIG), Aug. 11, 2013, pp. 1-9.

Smed et al, "Can We Prevent Collusion in Multiplayer Online Games?", Conference Paper, Oct. 2006, retrieved from: http://tinyurl.com/y7c653vr.

Sakasegawa et al, "Fight gaming fraud with AI and machine learning", BrightTALK Webinar, Jul. 31, 2018, retrieved from: https://tinyurl.com/yca8ybvz.

* cited by examiner

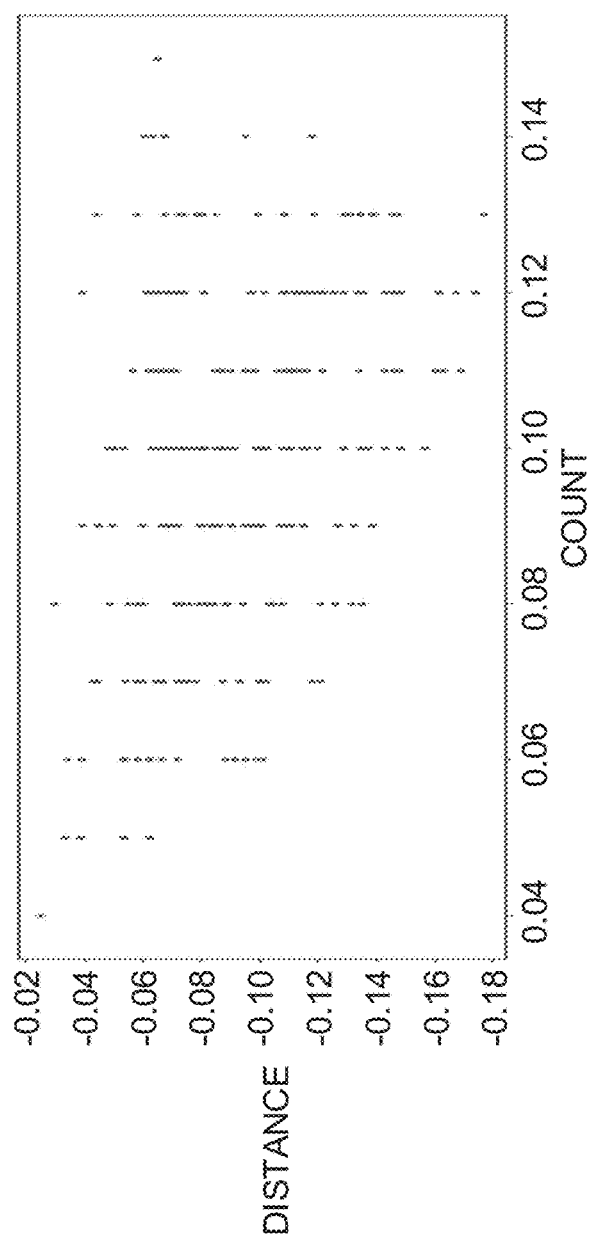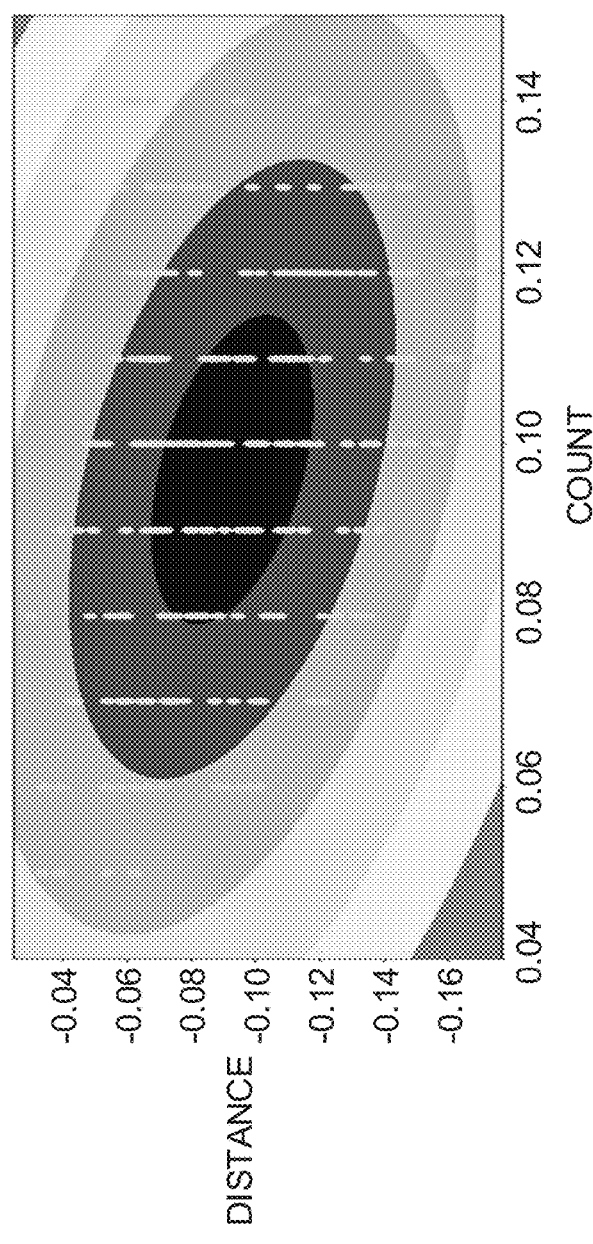

SYSTEM AND METHOD FOR OUTLIER DETECTION IN GAMING

FIELD OF THE INVENTION

Embodiments of the invention relate to a technology for detecting outliers in time series data, for example, for detecting fraudulent events or technical problems in online gaming patterns.

BACKGROUND OF THE INVENTION

The online gaming industry is a billion dollars industry with companies that are worth hundreds of millions of dollars, each handling tens of millions of users. Some of the most significant challenges these companies face is fraud. Fraud not only causes enormous financial damage to gaming companies, but also damages their credibility. Creating and operating a massive multiplayer game hosting millions of online gamers is a challenging effort. Gaming companies expose themselves to many attacks and fraud. Fraud detection may include monitoring of spending and gaming patterns of players in order to detect undesirable behavior.

Operating large scale online games require significant investment in information technology (IT) and operations Maintaining a robust online gaming system requires fast response times. IT problems, also referred to herein as operational problems, such as server and storage downtime, network disconnections, etc., can significantly impact player experience and as a result game revenue. Additionally, various activities such as deployment of new software versions of client and servers and new game features occur very frequently. Any mistake carried over these activities can range from impacting player experience to loss of payments.

As a result of fraud, the game economy is being compromised, the potential for players to progress in the game is damaged, and developers are losing potential revenue and have to compensate customers. In addition, due to operation failures, the games are perceived as not 100% stable and suffer from malfunctions and failures more frequently than desired. Both fraud and IT problems may damage the user experience of the players by not allowing them to progress in the game, go through stages and get the bonuses they deserve, thus reducing user satisfaction. These problems may even cause players to abandon the game. Thus, there is a need to improve the user experience by reducing operational malfunctions and fraud to the point of preventing them altogether.

Further, in general, outside the gaming industry, patterns of data exist which need to be analyzed in a more accurate manner, to find anomalies, outliers, etc.

SUMMARY

According to embodiments of the invention, there is provided a system and method for detecting anomalies in data, for example in in gaming patterns. Embodiments may include: obtaining a time series data related to events; extracting event features of the events; detecting outlier events in the time series data based on the event features; calculating, for each window, a set of window features based on the outlier events in the window; and detecting suspected windows in the time series data based on the window features.

According to embodiments of the invention, detecting outlier events in the time series data may include identifying outliers on a multi-dimensional feature space based on the event features using a machine learning algorithm.

According to embodiments of the invention, the outlier events may be detected based on density of events in a multi-dimensional feature space.

According to embodiments of the invention, detecting outlier events may include: defining an extent of time regarded as normal reference for future events; calculating a normalized density estimation for each of the events inside this time scale; assigning outlier probability for each of the events based on the normalized density estimation of the event; and determining that an event is an outlier event if the outlier probability of the event exceeds an outlier threshold.

According to embodiments of the invention, detecting suspected windows may include: calculating, for each window, a set of window features based on the outlier events in the window; modeling the window features by a generative model; assigning an outlier confidence value for each of the windows based on the distribution of the window features relatively to the generative model; and determining that a window is a suspected window if the outlier confidence value of the window exceeds a confidence threshold.

Embodiments of the invention may include analyzing the distribution of players inside the suspected windows by: finding unique players inside the suspected windows based on player attributes; and generating a unique player count histogram for each of the suspected windows by counting the number of outlier events associated with each of the unique players inside each of the suspected windows.

Embodiments of the invention may include: determining whether the outlier events in a suspected window originate from one of a fraudulent event and an operational problem, based on the unique players count histogram.

According to embodiments of the invention, determining the origin of the outlier events in the suspected window may include: calculating a measure of variability of the unique players count histogram; and determining that the outlier events in the suspected window originate from the fraudulent event if the measure of variability exceeds a variability threshold and that the outlier events in the suspected window originate from the operational problem otherwise.

Embodiments of the invention may include: obtaining labeled outlier events, the label suggesting whether the labeled outlier event represents a fraudulent event; and using the labeled outlier events to adjust parameters related to the detection of the outlier events and the detection of the suspected windows.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 7 presents an enlargement of the top-left part of FIG. 6;

FIG. 8 depicts the same data as in FIG. 7 on top of a Gaussian model that was fitted to the data, according to embodiments of the present invention;

Figure 1:
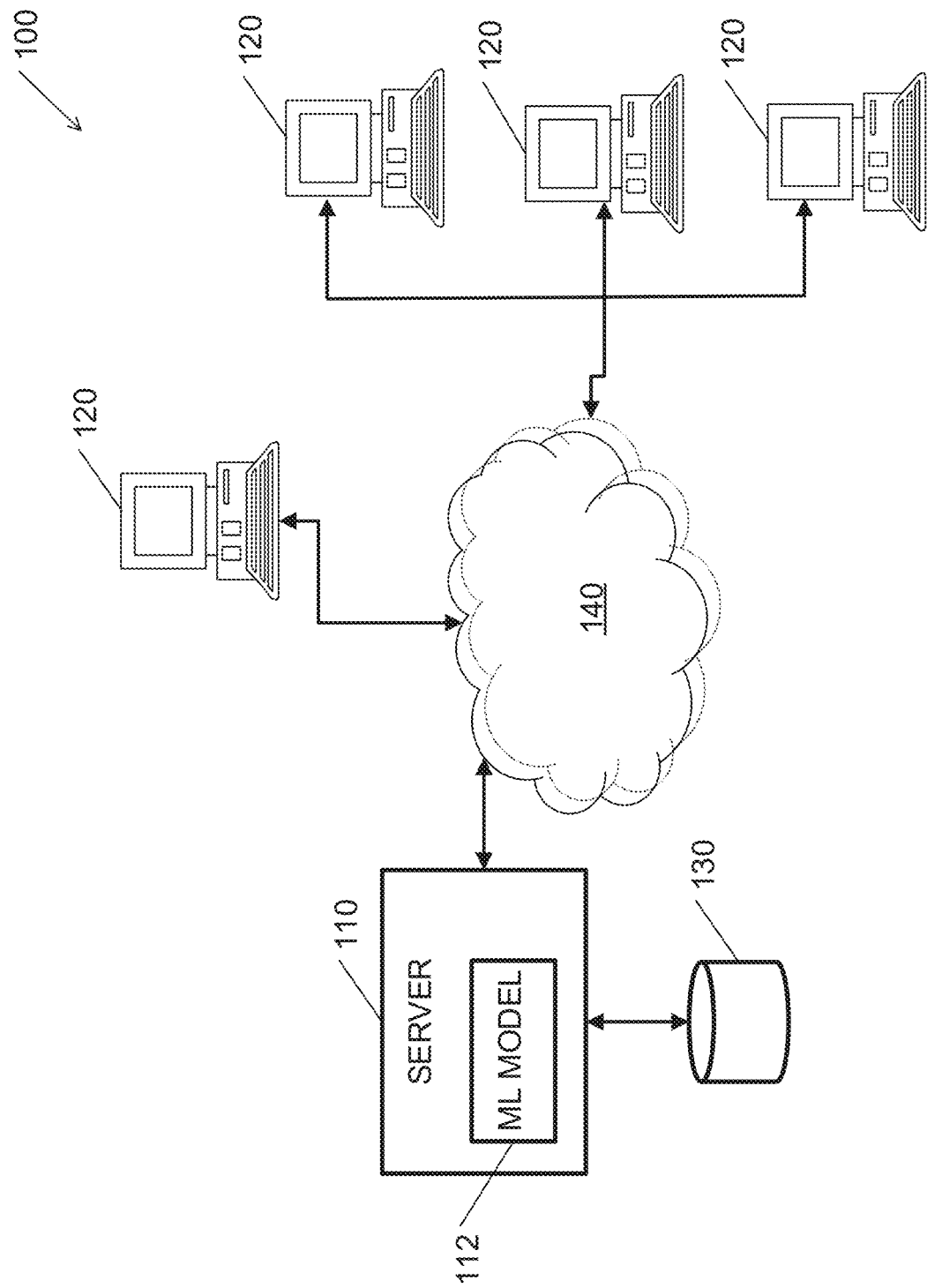
FIG. 1 schematically illustrates a system, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention pertain, inter alia, to the technology of anomaly detection in multidimensional time data series, and specifically, to the technology of anomaly detection in the online gaming industry. Embodiments of the invention may provide a technological infrastructure for generic time series outlier detector aimed at detecting anomalies, faults or error conditions in the time series data by analyzing play and payment patterns of players. Embodiments of the invention may significantly reduce operational costs and loss caused by fraud or operational mistakes, and enhance the players' gaming experience. The anomalies, faults or error conditions may include operational problems such as software or hardware malfunctions or breakdowns, human mistakes, and other problems. The anomalies, faults or error conditions may include intentionally damaging, illegal or fraudulent human events, referred to herein as fraud.

Embodiments of the invention may obtain multi-channel time series data including gaming activities of players. The time series data may be analyzed to provide an indication of outlier events in the time series data. Embodiments of the invention may further analyze the origin or root cause of the outlier event, e.g., whether an outlier event is a result of a fraud or a result of an IT problem. Outliers in the time series data may be detected using an ensemble of unsupervised and supervised techniques for time series outlier detection and classification.

Embodiments of the invention may automatically detect outliers on massive scale multi-channel data streams using machine learning (ML) and artificial intelligence (AI) models. Embodiments of the invention may maintain low false alarm rate, quick response time and high detection accuracy.

Embodiments of the invention may follow and listen to matrices and player parameters, and may give an indication about players and events, suggesting whether the players and events are proper or relate to an anomaly. In addition, embodiments of the invention may identify fraud and distinguish between legitimate changes and operational failures.

The main technological challenge is to find true outliers in multi-dimensional feature space. Typically, higher dimensions induce larger number of false outliers. The higher the dimension of the data, the less contrast the outliers present relatively to the normal events which leads to a high false alarm rate (FAR). Techniques based on data mining, machine learning, sequence alignment and artificial intelligence have been introduced for credit card fraud detection. These techniques, however, are not optimized for the gaming domain or other domains where the nature of outlier events and their patterns are different. For example, games may involve random mechanisms that introduce events that are normal to the environment being analyzed (e.g. a game) but may seem as outliers to prior art methods for outlier detection. These events may include, for example, large wins in a casino game or other games. Embodiments of the invention may improve the technology for anomaly detection by distinguishing between many natural outliers (e.g. game related natural outliers) and outlier originated by fraud or operational problems. Embodiments of the invention are tailored to detect fraud and operational problems considering the amount and appearance of natural outliers. In one embodiment these outliers may be those unique to the gaming industry and specifically for casino or other games which are based on large legitimate random outcomes resulting from gaming actions.

Embodiment of the invention may improve the technology of outlier detection by providing an ability to accurately detect outliers with low amount of false alarms, while enabling the user to control the tradeoff between recall (e.g., true positive rate) and precision or false positive rate using, for example a receiver operating characteristic (ROC) curve, where each point on the graph corresponds to a different detection threshold over the confidence value. For example, in some embodiments, a confidence value may be calculated for each suspected window. A threshold may be determined to distinguish suspected windows (e.g., windows that contain events that are suspected as abnormal, e.g., fraud or an operational problem) from normal windows (e.g., windows that contain legitimate events). The tradeoff between recall and precision may be controlled by selecting the threshold.

The results may be further improved based on user feedback. Since embodiments of the invention utilize learning models, embodiments of the invention may adapt to non-stationary environments. Time series data of on-line games frequently change its patterns based on new gaming features which are usually introduces on a daily basis and have significant impact on the gaming habits of the players. Furthermore, embodiment of the invention may enable analyzing large volume of data arriving at high velocity, e.g., more than 1 billion events a day in near real-time.

By detecting the source of outlier events, embodiments of the invention may help to overcome and prevent game operation failures and significantly reduce the possibility of fraud. As a result, embodiments of the invention may increase the reliability of the games, making them better than prior art online games by being more stable with less failures and malfunctions. Moreover, embodiments of the invention may reduce the damage to the users because fraud harm the pool of benefits and bonuses that are divided to users. Thus, preventing and reducing fraud may improve the user experience.

Reference is made to FIG. 1, which schematically illustrates a system 100, according to embodiments of the invention. System 100 may include server 110 to conduct and operate online games between server 110 and user devices 120, or among user devices 120 themselves. Server 100 may be configured to detect outliers in gaming patterns and analyze the root cause of the outliers, as disclosed herein. For example, server 100 may be configured to train and use ML model 112 to detect outliers in a multi-channel time series data, as disclosed herein. ML model 112 may include clustering methods such as K-means, GMM, mean shift, spectral clustering, density-based spatial clustering of applications with noise (DBSCAN), hierarchical clustering, etc., density and distance methods such as Parzan window, k-nearest neighbor (KNN), local outlier factor (LOF), LOOP and/or nonparametric methods such as support vector data description (SVDD), one class support vector machine (SVM), etc. Server 100 may be further configured to detect suspected windows or periods in the multi-channel time series data based on the detected outlier events, as disclosed herein. Server 110 may be connected to database 130 for storing time series data related to gaming patterns of players, such as bets and wins, log in times, levels, scores, bonus amounts and other gaming related player actions and received outcomes over time, and other data such as features extracted from the time series data, model parameters, and any other data as may be required.

System 100 may be connected, or configured to be connected, to one or more user devices 120, such as, computers, smartphones gaming consoles, etc., over network 140. Users may use user devices 120 to connect to and play at online games provided by server 110, for example, using or operating user devices 120.

Figure 12:
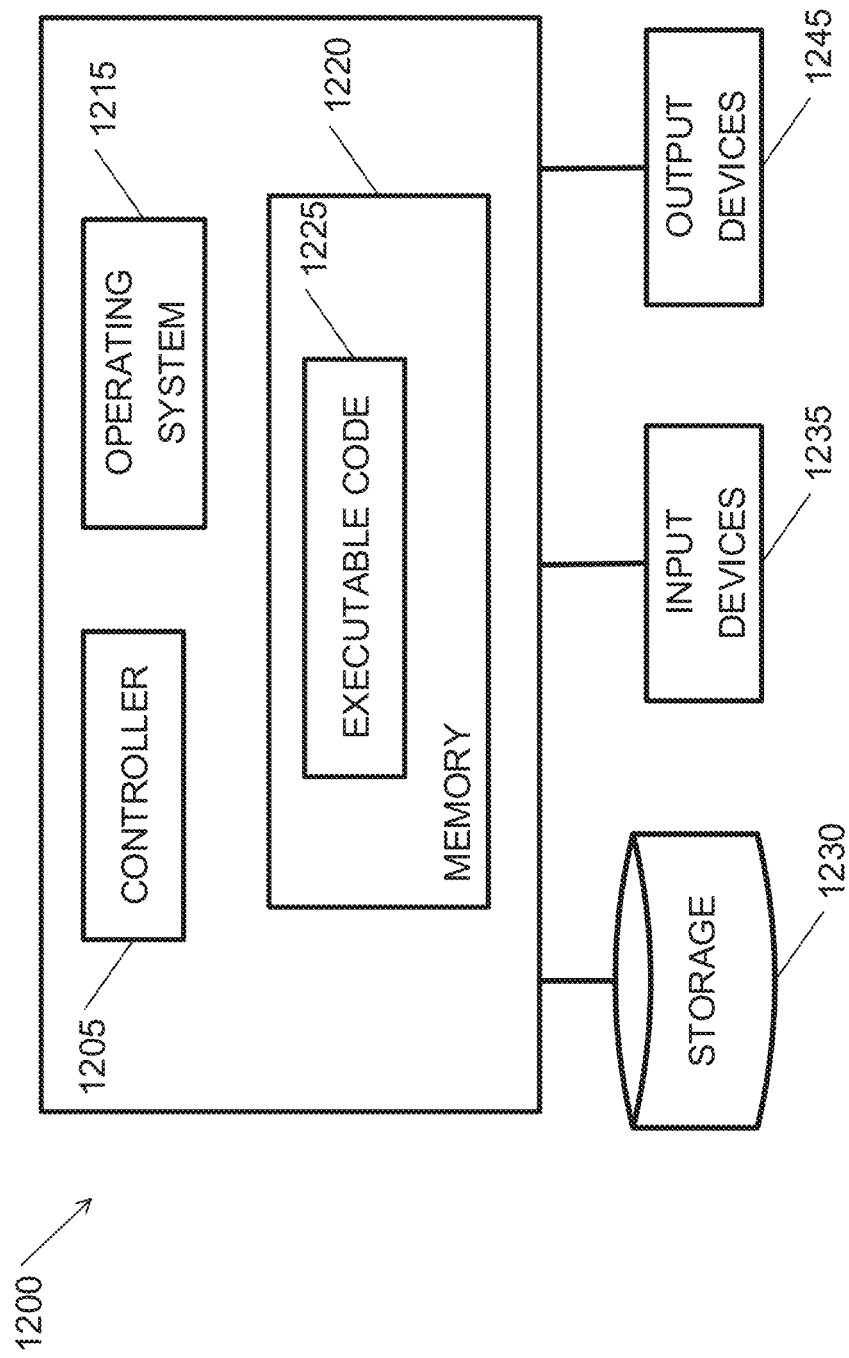
FIG. 12 is a high-level block diagram of an exemplary computing device, according to some embodiments of the present invention.

Each of user devices 120 and server 110 may be or may include a computing device such as computing device 1200 depicted in FIG. 12. Database 130 may be or may include a storage device such as storage device 1230.

Figure 2:
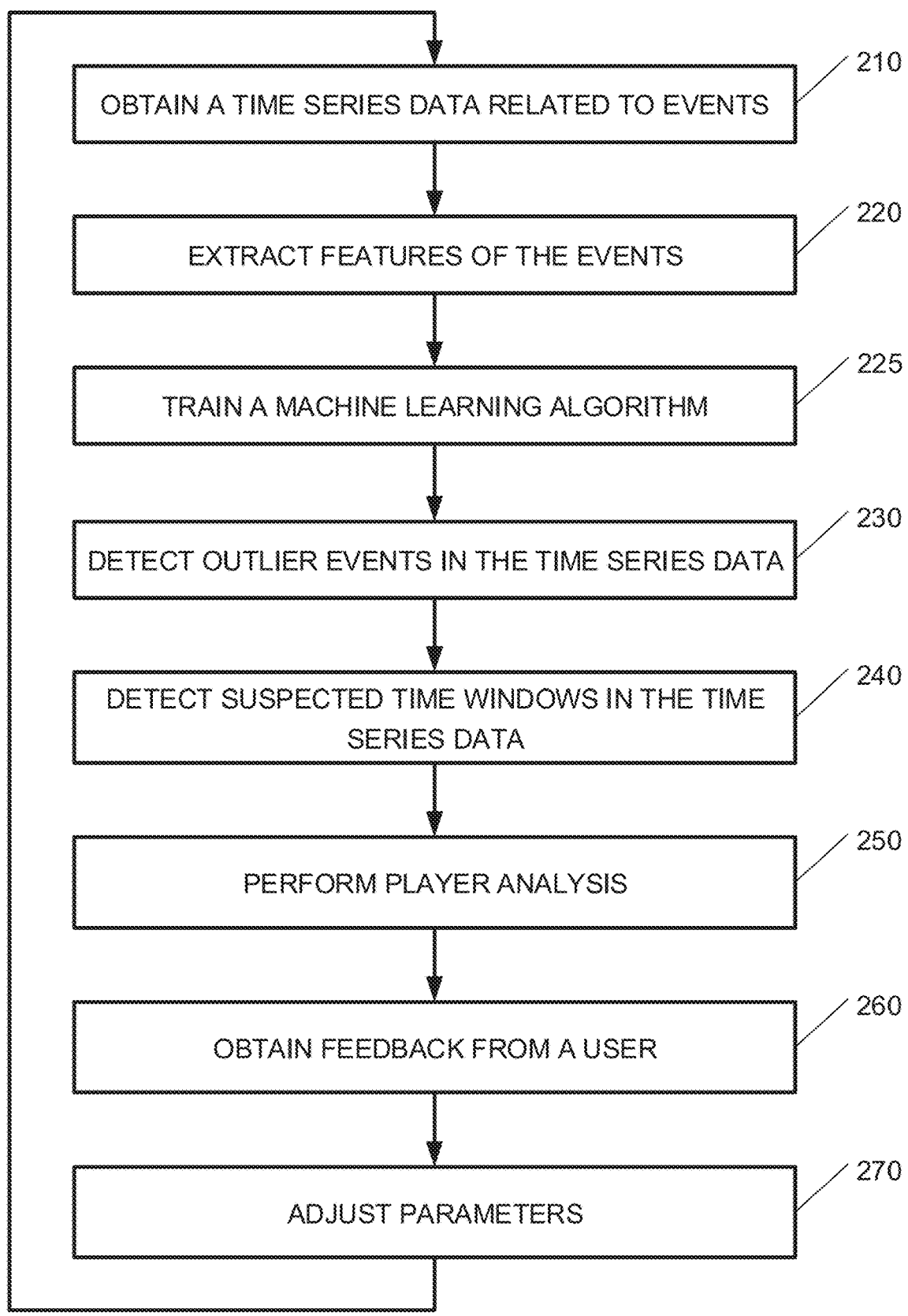
FIG. 2 is a flowchart of a method for detecting anomalies in gaming patterns, according to embodiments of the present invention.

Reference is now made to FIG. 2 which is a flowchart of a method for detecting, flagging or categorizing anomalies or other error conditions in activities or data, such as in gaming patterns, according to embodiments of the present invention. An embodiment of a method for detecting anomalies in gaming patterns may be performed, for example, by server 110 presented in FIG. 1, but other hardware may be used.

In operation 210 time series data related to or describing events (also referred to herein as samples), software actions data, or activities may be obtained. The events, actions, data or activities can be for example those taking place in the real world (e.g. a user providing input), or software (e.g. a computer program taking action or receiving input). In one embodiment the events may include gaming activities of players and/or received outcomes, such as bets and wins, log in times, levels, scores, bonus amounts and other gaming related player actions and received outcomes, etc. Other data, not relating to games, may be analyzed. When discussed herein, the event may refer both to the real-world action, and/or its data representation.

The time series data may be in the form for example of a multi-channel time series $\{x_i^t\}$ where x indicates an event value (e.g., gaming activities of players and received outcomes, such as a value of bets and wins), i=1, 2, . . . , n indicates channel number, e.g., an identifier of a single stream of time series data, for example bets over time of a player may be a first channel, wins a second channel etc., and t=1, 2, . . . , m indicate time of sample or sample number (the terms sample and event may be used interchangeably herein). Data may be collected or obtained from various data sources such as game databases (e.g., as database 130 presented in FIG. 1) storing the different game related actions and from a client module running on user devices (e.g., user devises devices 120) which may record actions taken by the player client module and related outcomes. The data may be compiled into a multi-channel time series data format. For example, data describing the various events which may arrive asynchronously from the various databases and user devices, may be arranged according to player identity number (ID) and sorted by time of occurrence (e.g., the time the event took place). For example, in some embodiments, each data item of events may be associated with a timestamp. Thus, the time series data may include, for each player ID, a plurality of channels including event values of a particular event type over time. In addition, raw data may be processed to replace missing values, for example by the mean of similar events. Categorical variables may be formulated, for example by replacing each categorical variable with one or more binary variables. Examples for categorial values may include game types or names, that may each be replaced by a scalar value.

Figure 3:
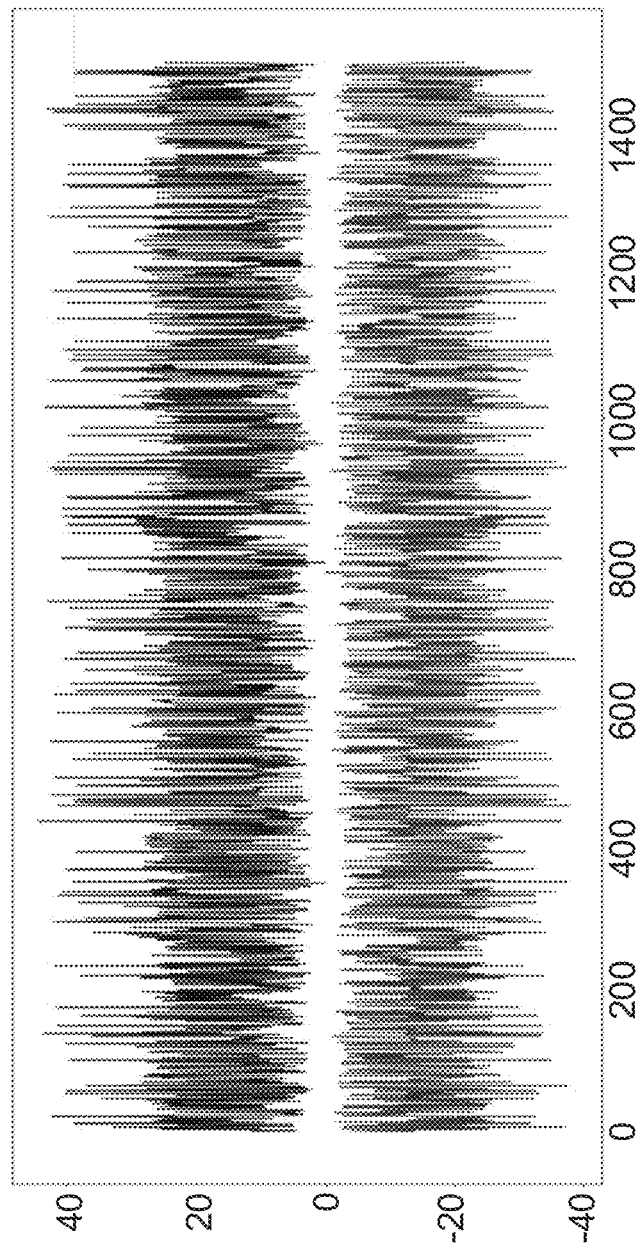
FIG. 3 depicts an example of time series data, helpful in explaining embodiments of the invention.

The time series data may be normalized, e.g., using any applicable method such as range scaling, Z score, principal component analysis (PCA), etc. In some embodiments, addresses for various databases (e.g., database 130) for collecting and storing events data such as the Apache Kafka database may be obtained. An example of time series data is presented in FIG. 3. FIG. 3 includes time series data of two example channels—the bottom channel is bets and the top channels is wins of a single player. The X-axis is sample number.

In operation 220 event features of the events may be analyzed or extracted. Features may include statistics on the time series data in a time period, e.g., average, standard deviation, percentiles, ratios, etc. Examples may include average bets in a time period, e.g., one hour, one day, etc., average session (e.g., game) length in a time period, number of logins in a time period, ratios of the above features, e.g., average bets to average wins ratio, and ratios of the above features in different time periods, e.g., average bets in one hour divided by average bets in a day. The events and the extracted features may be arranged in an n by m matrix of n events and m features for each event. The different events may be arranged and aligned according to their time of occurrence. The features of the events may define a multi-dimensional feature space.

In operation 225 a machine learning algorithm or model may be trained using time series data representing normal behavior. Operation 225 may be optional, e.g., embodiments of the invention may detect point outliers in operation 230 based on real-time data without a prior training phase. In some embodiments training may be performed in a preliminary step before starting detecting point outliers. In some embodiments operation 225 may be performed occasionally or at known time intervals and/or following software upgrades that may introduce new legitimate gaming patterns. For example, operation 225 may be repeated daily and/or after software upgrades, etc. In some embodiments operation 225 may be initiated manually by a human operator. In some embodiments operation 225 may be initiated automatically by the system, for example, at predetermined times and/or following software upgrades, and/or after a preconfigured time interval when no suspected windows are detected (e.g., in operation 240).

In some embodiments, the training phase may include calculating and storing the density of normal events and other model parameters. The events in the training set may be labeled as normal by a human operator and/or by embodiments of the method for detecting anomalies disclosed herein. The following example of training phase calculations may be implemented in training phase 225 adjusted to train a local-outlier probability (LoOP) model. However, other algorithms for estimating the density of normal samples and other equations may be used.

In a training phase 225, when LoOP model is used, D may include the set of n normal events used for training the LoOP model. The standard distance, $\sigma(z_i, S)$, of a normalized sample (or event) $z_i$ to its local context set S may be calculated by:

$$\sigma(z_i, S) = \sqrt{\frac{\sum_{s \in S} d(z_i, s)}{|S|}} \quad \text{(Equation 1)}$$

where d is a distance function (e.g., a mathematical distance between points in a multi-dimensional space, for example, Euclidian distance) and the context set, and the context set, S, may include the k nearest neighbors of sample $z_i$. A probabilistic set distance, $pdist(\lambda, z_i, S)$, of $z_i$ to S with significance $\lambda$ may be defined by:

$$pdist(\lambda, z_i, S) = \lambda \cdot \sigma(z_i, S) \quad \text{(Equation 2)}$$

Intuitively, the probabilistic set distance may provide an estimate of the density around $z_i$ based on S. The significance $\lambda$ may be a normalization factor that may adjust the approximation of the density. The significance $\lambda$, however, may impact only the contrast in the resulting scores. A probabilistic local outlier factor, PLOF, of an object $z_i \in D$ with respect to a significance $\lambda$, and a context set $S(z_i) \subseteq D$, may be defined by:

$$PLOF_{\lambda,S}(z_i) = \frac{pdist(\lambda, z_i, S(z_i))}{E_{s \in S(z_i)}[pdist(\lambda, z_i, S(s))]} - 1 \quad \text{(Equation 3)}$$

Where $E_{s \in S(z_i)}[pdist(\lambda, z_i, S(s))]$ represents the average of the probabilistic set distances of all the samples in the context set $s \in S(z_i)$. To achieve a normalization making the scaling of PLOF independent of the specific data distribution, an aggregated value nPLOF may be calculated by:

$$nPLOF = \lambda \cdot \sqrt{E[(PLOF)^2]} \quad \text{(Equation 4)}$$

Then, the local outlier probability, LoOP, indicating the probability that a point $z_i \in D$ is an outlier may be calculated by:

$$LoOP_S(z_i) = \max\left\{0, \text{erf}\left(\frac{PLOF_{\lambda,S}(z_i)}{nPLOF \cdot \sqrt{2}}\right)\right\} \quad \text{(Equation 5)}$$

where erf is an error function. The significance and the number of nearest neighbors, k, used for the LoOP calculations may be adjusted by calculating the local outlier probability, $LoOP_S(z_i)$, for each of the samples in the training set, and selecting $\lambda$ and k according to the local outlier probability distribution in the training set. For example, $\lambda$ and k that provide the lowest average outlier probability may be selected, or $\lambda$ and k for which no local outlier probability, $LoOP_S(z_i)$, of each of the samples in the training set is above a predetermined value, e.g., 0.8 may be selected. other criteria may be used. The training set D and the parameters $\lambda$ and nPLOF are stored and may be used for calculating LoOP for a given new sample $z_j$. According to some embodiments, the training set, D, may be adjusted or updated, e.g., by adding more normal samples or by removing old samples. The training set, D, may be adjusted or updated periodically, manually or automatically, by adding new events. For example, new events of a day may be added to D in the evening. In some embodiments, only events that were categorized as normal are added, in some embodiments, new events that represent new normal activity that is a result of for example a software update may be added to the training set, D. In some embodiments, old samples may be deleted or removed from the training set, D, to keep the training set, D, updated and up-to-date. For example, samples from more than two weeks ago may be deleted from the training set, D. The training set, D, may be updated whenever operation 225 is repeated. Regulating the time of operation 225 may balance between the requirement for adjusting to legitimate non-stationarity of the time series data and the requirement to detect operational problems. Legitimate non-stationarity of the time series data may be a result of software updates that may change the legitimate patterns of the time series data. Thus, if a machine learning model is trained based on time series data that represents legitimate gaming activity prior to the software update, it may detect the new legitimate patterns of the time series data that are a result of the software update as outliers. However, non-stationarity of the time series data may be a result of an operational problem. Non-stationarity of the time series data that is a result of an operational problem may generate new clusters of events that may be dense. Thus, if the machine learning model is constantly trained using real-time time series data, it may learn the new patterns that are a result of the operational problem and may not detect these patterns as outliers.

In operation 230 outlier events (also referred to herein as point outliers) in the time series data may be detected based on the event features. Outlier events may be detected in the time series data using a machine learning algorithm, e.g., an unsupervised machine learning algorithm. Outlier events may be detected using, for example, clustering methods such as K-means, GMM, mean shift, spectral clustering, DBSCAN, hierarchical clustering, etc., density and distance methods such as Parzan window, KNN, LOF, LoOP and/or nonparametric methods such as SVDD, one class SVM, etc.

Figure 4:
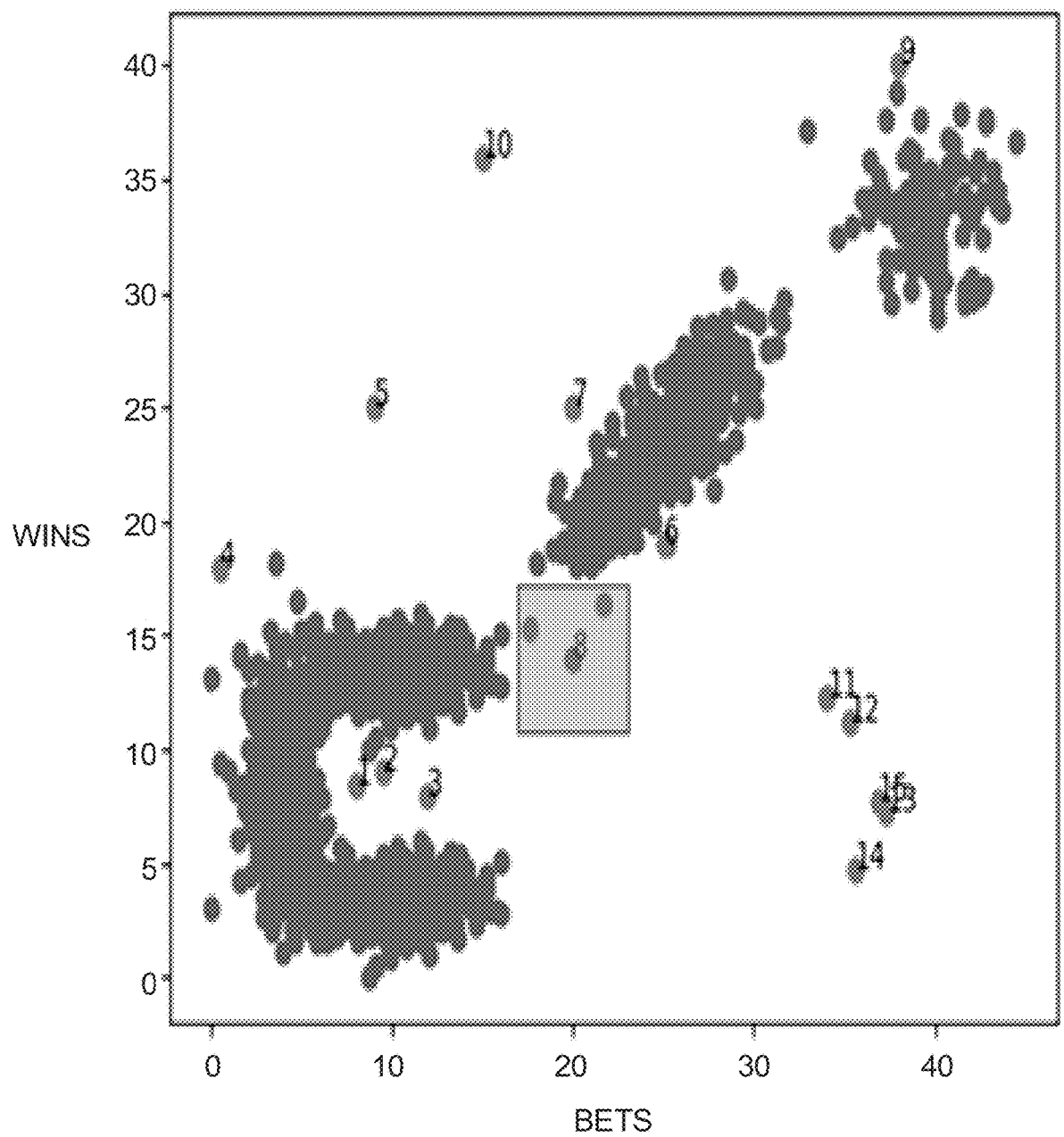
FIG. 4 depicts a two-dimensional feature space, helpful in explaining embodiments of the invention.

In some embodiments, outlier events may be detected based on density of events in the high dimensional feature space using density-based clustering methods. The multi-dimensional feature space may be defined by the features extracted in operation 220. An example of a two-dimensional feature space is presented in FIG. 4. The dimensions in FIG. 4 are bets and wins. Other dimensions may be defined and used, in addition or instead of the features presented in FIG. 4. FIG. 4 depicts the wins and bets presented in FIG. 3 as time series data, in a two-dimensional space defined by the bets and wins, e.g., the wins drawn against the bets. Thus, in this context, an event may be a win following a bet, and each event is represented in FIG. 4 as a single point or sample in the bets-wins space. It should be readily understood that more features may be used, creating a multi-dimensional feature space. As can be seen in FIG. 4 most of the events are located close together. It is assumed that dense, or close together events represent normal gaming activities, while far away or isolated events, e.g., events 1-15 in FIG. 4, may represent outliers. Also, it is assumed that outliers may be related to or the result of abnormal behavior that may be a result of fraud or operational problems. Thus, an important step of detecting fraud or operational problems in the multi-channel time series data is detecting outliers in the multi-dimensional feature space. Density-based clustering algorithms may group together events in the feature space that are close together, e.g., events with many nearby neighbors, and may mark events whose nearest neighbors are far away, as outliers.

In some embodiments the predict operation (e.g., the detection of outliers) may include measuring the distances of a new events with respect to the stored density of the normal events (e.g., as calculated in operation 225) and the outlier probability may be normalized by the parameters generated in the training phase e.g., operation 225. For example, determining whether a new event is an outlier may be performed by:

- calculating a normalized density estimation, (e.g., the probabilistic local outlier factor $PLOF_{\lambda,S}(z_i)$) for the new event, e.g., by dividing the density of the new event (e.g., the probabilistic set distance, pdist $(\lambda, z_j, S(z_j))$) by the density of its neighbor events (e.g., the average of the probabilistic set distances of the samples in the context set $S(z_j) \subseteq D \ E_{s \in S(z_j)}[\text{pdist}(\lambda, z_j, S(s))]$). In some embodiments, the density of the new event may be calculated with respect to the stored samples of the training set (e.g., the samples used in operation 225).
- assigning an outlier probability (also referred to herein as the local outlier probability), e.g., by scaling the normalized density estimation to probability values between 0 and 1, for each of the events based on the normalized density estimation of the event. and
- determining that the new event is an outlier event if the outlier probability of the new event exceeds (e.g., is larger than) an outlier threshold and that the new event is not an outlier event if the outlier probability of the new event does not exceed (e.g., is not larger than) an outlier threshold.

For example, when using the LoOP model, the local outlier probability, $LoOP_S(z_j)$, (also referred to herein as the outlier probability), indicating the probability that a new sample, $z_j$, is an outlier may be calculated by:

$$LoOP_S(z_j) = \max\left\{0, \text{erf}\left(\frac{PLOF_{\lambda,S}(z_j)}{nPLOF \cdot \sqrt{2}}\right)\right\} \quad \text{(Equation 6)}$$

where erf is an error function. $PLOF_{\lambda,S}(z_j)$ may be calculated using Equation 3, where the context set $S(z_j) \subseteq D$, of the new sample, $z_j$, may include the k nearest neighbors of sample $z_j$ within the training set D.

Detecting outliers in the multi-dimensional feature space may be an important step in detecting, flagging, or categorizing anomalies, e.g., fraud or operational problems. However, detecting outliers in the multi-dimensional feature space may not be by itself enough for detecting fraud or operational problems, since in many gaming situation normal and legitimate activities, such as legitimate high wins, may be manifested as outliers. Thus, not every outlier may be a result of fraud or an operational problem. Relaying on outlier detection alone for detecting fraud or operational problems may result in high false positive rate that is problematic and undesirable. Thus, according to embodiments of the invention, outlier detection may be followed by analyzing outlier patterns in time periods or windows in an attempt to filter legitimate outliers and reduce the false positive error rate. Thus, embodiments of the invention may include integrating the point outliers into time series context and marking potential windows as suspected windows due to the content and pattern of outlier events within these windows. The algorithm used for detecting suspected windows may identify non-stationarity of the time series and may trigger modeling of the new environment. Detecting suspected windows may be performed using neural networks such as recurrent neural networks (RNN), long short-term memory (LSTM), convolutional neural network (CNN), etc., and/or using temporal models such as prediction based, autoregressive integrated moving average (ARIMA), multi time scale analysis, etc. According to embodiments of the invention suspected windows may be detected by windows modeling, counting the number outliers in each window and summing their distances from their nearest neighbors or LoOP scores. Detection of windows is also a way to overcome the non-stationarity of the game, since in a given small enough window, as used herein, a window may be defined by time, e.g., a time window, or by a member of events, e.g., of 100-200 events, it may be assumed that the game is stationary.

In operation 240 suspected windows may be detected in the time series data based on the detected outlier events in windows of the time series data. Suspected windows may be windows which include abnormal behavior, e.g., includes events that are suspected as fraud or a result of an operational problem. Windows may be recognized as suspected windows based on the pattern and distribution of outlier events in the window as disclosed herein.

Figure 5:
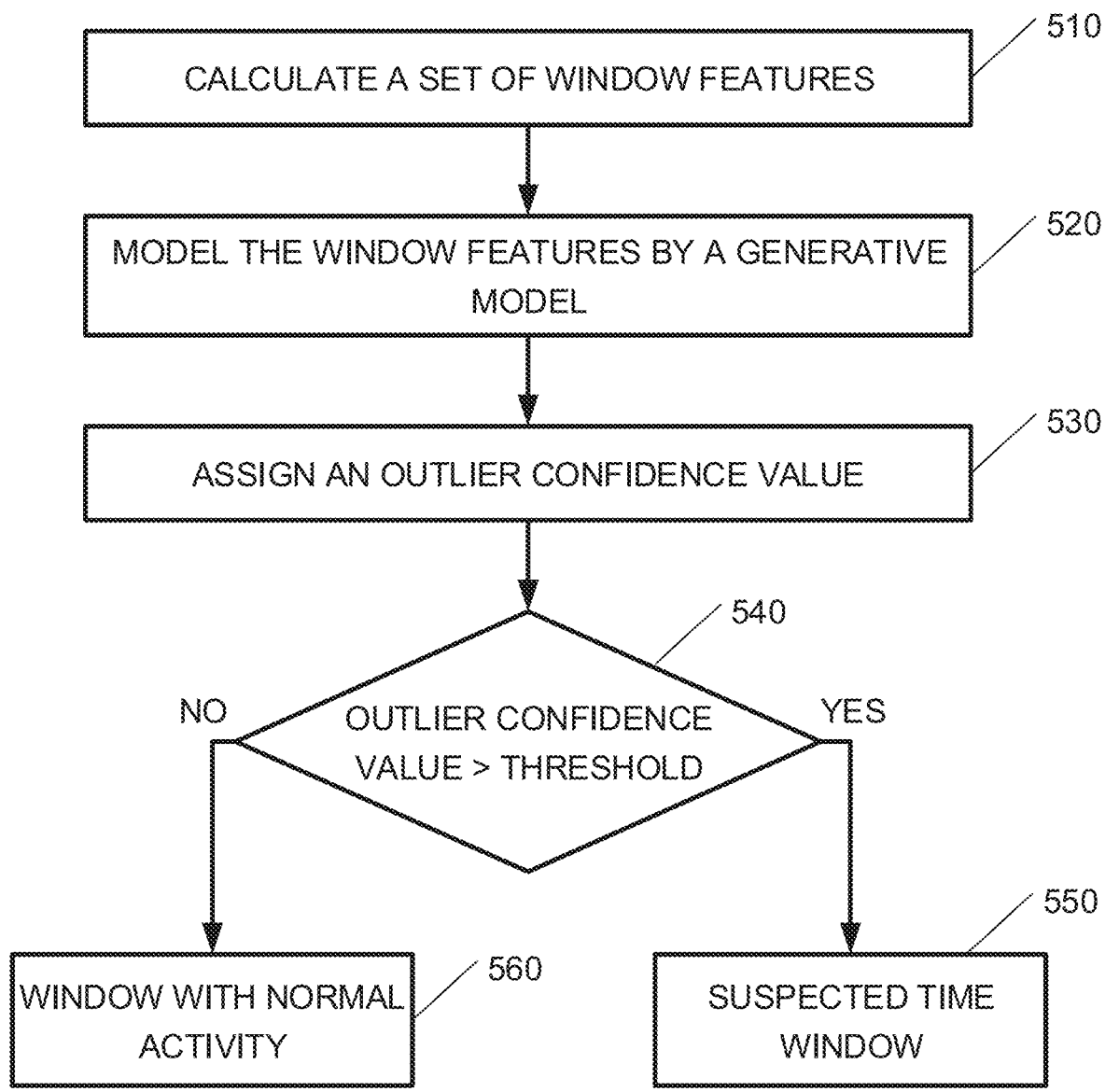
FIG. 5 is a flowchart of a method for detecting suspected windows, according to embodiments of the present invention.

Reference is now made to FIG. 5 which is a flowchart of a method for detecting suspected time windows, according to embodiments of the present invention. Embodiments of the invention presented in FIG. 5 may be an elaboration of operation 240 of FIG. 2. The operations of FIG. 5 may be repeated for each desired window in the time series data, e.g., for a sliding window (e.g. a window whose start time is varied, to move the window across data). In some embodiments the size of the window may be 100 events, however other sizes may be used. In some embodiments the stride of the sliding window may be of a single event, however other stride length may be used.

Figure 6:
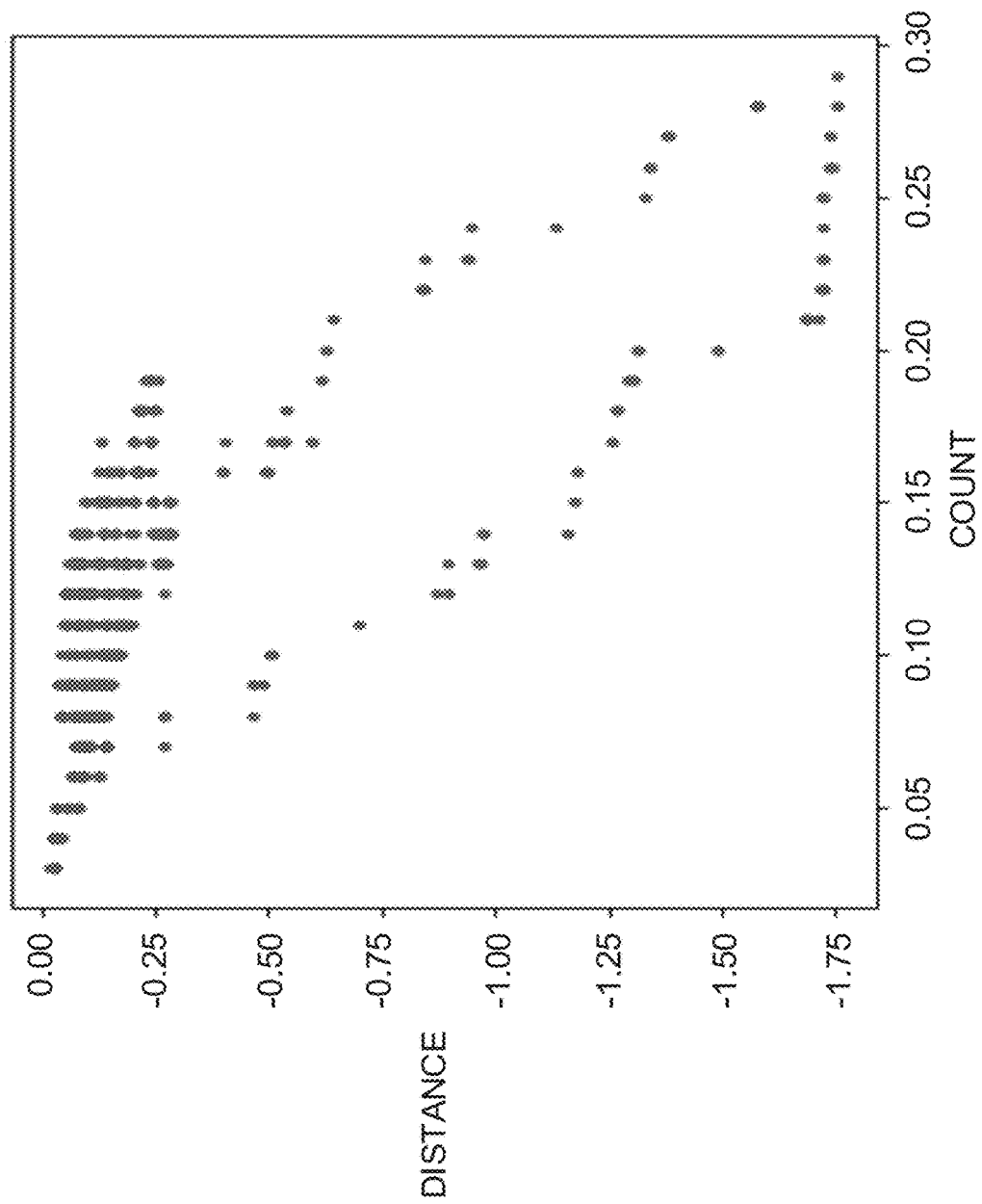
FIG. 6 depicts a plurality of windows in a two-dimensional window-feature space, according to embodiments of the invention.

In operation 510 a set of window features may be calculated for the window, based on the outlier events in the window. The window features may include features that are calculated based on the outlier events in the window only (e.g., not considering normal events in the window). Window features may include the number or count of detected outlier events in the window, e.g., outlier events detected in operation 230, a metric based on (e.g., average, median etc.) the outlier probability assigned to the detected outlier events in the window, a metric based on (e.g., average, median etc.) the distances of the detected outlier events in the window from their neighbors, a metric based on (e.g., average, median etc.) the relative locations of the detected outlier events in the window, etc. The window features may define a multi-dimensional window-features space in which each window may be represented as a single point or sample (similarly to the events in the multi-dimensional feature space). FIG. 6 depicts a plurality of windows in a two-dimensional window-feature space defined by distances and count of outlier events in the windows.

In operation 520 the windows may be modeled in the window-features space, e.g., by a generative model. The generative model may include a Gaussian model or other generative model such as Hidden Markov Model, Restricted Boltzmann Machine and Variational Autoencoders. FIG. 7 presents an enlargement of the top-left part of FIG. 6, and FIG. 8 depicts the same data on top of a Gaussian model that was fitted to the data. The ellipsoids represent contour lines of the Gaussian model, e.g., curves along which the Gaussian model has a constant value. It can be seen in FIG. 6 that windows at the bottom left side of FIG. 6 deviate from the Gaussian model both by their count and distance values.

In operation 530 an outlier confidence value based on the location of the window features in the generative model space may be assigned for each of the windows based on the distribution of the window features relatively to the generative model. For example, when Gaussian probability model is fitted to the data, a mean vector $\bar{\mu}$ and a covariance matrix $\Sigma$ for features of normal windows $w_i$ (e.g., windows in the training set that are labeled as normal) may be calculated based on the feature values in these windows $\bar{z}_i = \{z_i^l\}$ where i=1, 2, . . . , n indicates window number and l=1, 2, . . . , m represents the various features Then for a window $w_j$ the confidence value, $p_j$, may be calculated based on the mean vector $\bar{\mu}$ and the covariance matrix $\Sigma$ of normal windows, for example by (other calculations may be used):

$$p_j = \frac{1}{\sqrt{(2\pi)^k |\Sigma|}} \cdot \exp\left(-\frac{1}{2}(\bar{z}_j - \bar{\mu})^T \Sigma^{-1} (\bar{z}_j - \bar{\mu})\right) \quad \text{(Equation 7)}$$

In operation 540 the confidence value may be compared with threshold (also referred to herein as a detection or confidence threshold). If the outlier confidence value of the window exceeds the threshold, e.g., is above the threshold, then it may be determined that the window is a suspected window, as indicated in block 550. If, however, the outlier confidence value of the window does not exceed the threshold, e.g., is not above the threshold, then it may be determined that the window includes only legitimate events and is not a suspected window, as indicated in block 560.

In some embodiments the confidence threshold may be determined, e.g., by an operator, to obtain a desired tradeoff between recall and precision. For example, a ROC curve may be generated (e.g., off-line) based on real world data for different values of the confidence threshold and the confidence threshold that provides the best tradeoff between recall and precision may be selected.

Returning to FIG. 2, in operation 250, player analysis may be performed. Player analysis may be performed in order to determine or estimate whether the outlier events in a suspected window originate from a fraudulent or from an operational problem. The basic assumption behind the players analysis is that operational problems will impact large number of players and fraud will be primarily focused on smaller number of players. In case the density is learned on normal events in operation 225, the appearance of new dense events such as operational problems may be accurately detected. By analyzing the distribution of events over players and assigning a score based on a measure of variability or a distribution metric, such as entropy or other similar metric, the source of the outlier events in a suspected window may be determined.

Figure 9:
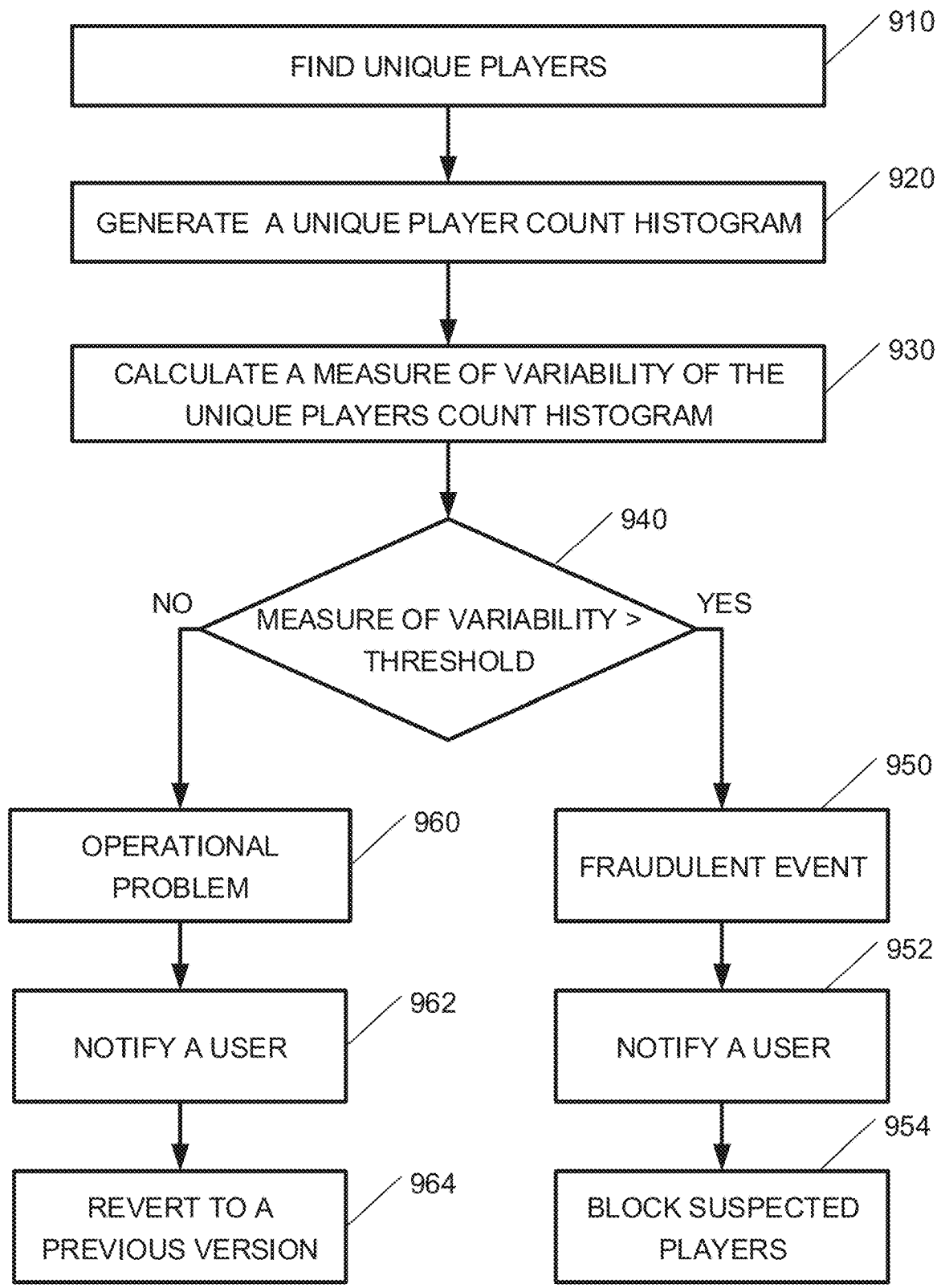
FIG. 9 is a flowchart of a method for performing player analysis, according to embodiments of the present invention.

Reference is now made to FIG. 9 which is a flowchart of a method for performing player analysis, according to embodiments of the present invention. Embodiments of the invention presented in FIG. 9 may be an elaboration of operation 250 of FIG. 2. The operations of FIG. 9 may be repeated for suspected windows found in operation 240.

In operation 910 unique players may be found or recognized inside the suspected windows based on player attributes. Unique player may refer to a single player, or to a group of players that seem to be related or originate from the same source. For example, some attackers may use several players accounts to perform fraud, in an attempt to disguise the fraud. A relation between players may be determined based on player features or attributes, e.g., same or similar internet protocol (IP) addresses, same or similar timing of outlier events, geographic location and other statistics. Thus, player features may be calculated or determined for each player, each player may be represented as a sample in a multi-dimensional player features space and unique players may be found using any applicable clustering method in the multi-dimensional player features space. Clustering methods may include K-means, GMM, mean shift, spectral clustering, density-based spatial clustering of applications with noise (DBSCAN), hierarchical clustering, etc., density and distance methods such as Parzan window, k-nearest neighbor (KNN), local outlier factor (LOF), local-outlier probability (LoOP) and/or nonparametric methods such as support vector data description (SVDD), one class support vector machine (SVM), etc.

Figure 10:
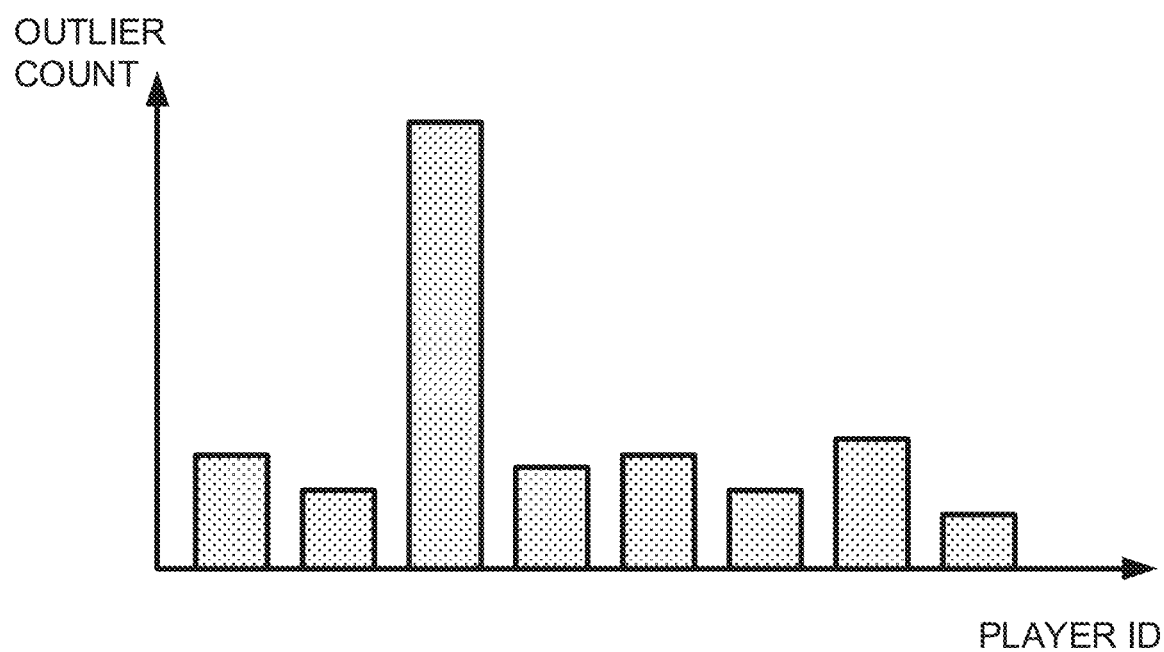
FIG. 10 depicts a first histogram of a first suspected window, according to embodiments of the present invention.
Figure 11:
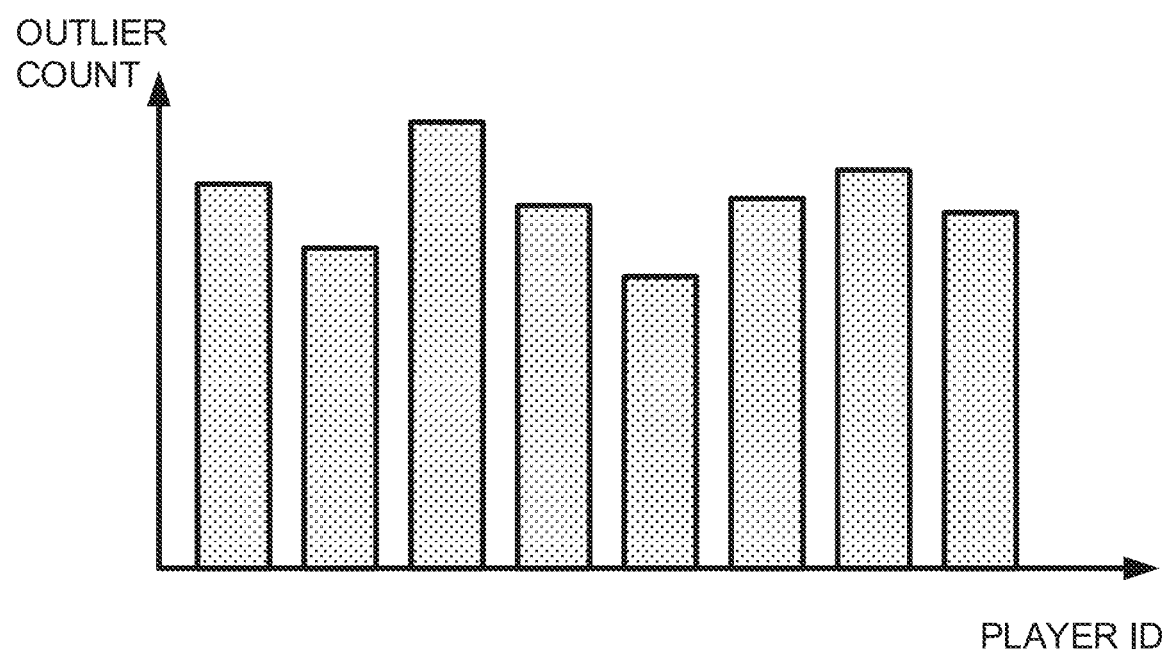
FIG. 11 depicts a second histogram of a second suspected window, according to embodiments of the present invention.

In operation 920 a unique player count histogram may be generated for each of the suspected windows by counting the number of outlier events associated with each of the unique players inside each of the suspected windows. FIG. 10 depicts a first histogram of a first suspected window and FIG. 11 depicts a second histogram of a second suspected window. As can be seen, in the histogram presented in FIG. 10 many outlier events are associated with a small number of unique players and in the histogram presented in FIG. 11 outlier events are associated with a large number of unique players. In operation 930, measure of variability of the unique players count histogram may be calculated. The measure of variability may include entropy, variance, standard deviation and any other applicable measure of variability. In operation 940 the measure of variability of the unique players count histogram may be compared with a threshold (also referred to herein as a variability threshold). If the measure of variability of the unique players count histogram exceeds the threshold, e.g., is above the threshold, then it may be determined that the outlier events in the suspected window originate from a fraudulent event, as indicated in block 950. If, however, the measure of variability of the unique players count histogram does not exceed the threshold, e.g., is not above the threshold, then it may be determined that the outlier events in the suspected window originate from an operational problem, as indicated in block 960.

If it was determined that the outlier events in the suspected window originates from a fraudulent event, as indicated in block 950, then a notification may be provided to a user or operator, as indicated in block 952. The notification may be provided in the form of a report describing the timing of the outlier events, the gamer details (e.g., user ID and IP address) of the suspected players, and any other relevant data. The notification may also include generating an alarm to attract the attention of the operator to the possible fraud. In operation 954, accounts of suspected players may be blocked, e.g., the suspected players related to the outlier events may not be allowed to perform any actions in the game, or may be restricted to only some permitted actions, e.g., until the suspected fraud is investigated.

If it was determined that the outlier events in the suspected window originate from an operational problem, as indicated in block 960, then in operation 962 the operator may be notified, similarly to operation 952. The notification may include a report and an alarm. The report may include any relevant data that may help an operator locate the source of the problem, e.g., the time of outlier events and their nature, or any other relevant data. In operation 964, in response to detection of an outlier, embodiments of the invention may automatically revert to a last version of software (e.g. a game) that did not produce outliers. Some embodiments may provide a recommendation to the operator to revert to the last known stable version of the software. For example, a log of software versions may be obtained and the system may revert (or provide a recommendation to revert) to a last version of the software that did not result in outliers. In such a manner the operation of software and computer systems which handle many events described by data may be improved.

Recurring to FIG. 2, in operation 260 feedback may be obtained from a user, for example labels. A label or a tag may given by a human operator to events detected as outliers in operation 230 or to windows detected as suspected windows in operation 240. Thus, the label or tag may suggest or describe whether the classification of an event as an outlier event or a window as suspected window is correct, e.g., whether the outlier event represents a true abnormal event, e.g., fraudulent event or an operational problem, or whether a suspected window includes normal and legitimate behavior. The label may be provided by a human operator. In operation 270 the labeled outlier events may be used to adjust parameters related to the detection of the outlier events, the detection of the suspected windows and any other relevant parameter. For example, the labeled inputs may be processed, and all thresholds and parameters of various components may be adjusted, using for example an ML classifier, to minimize the amount of false positive while satisfying high accuracy level. The classifier may be based on imbalanced weakly supervised or cost sensitive classification methods to set decision threshold, and sequential optimization approaches to tune the thresholds and other parameters of the algorithms. Operations 260 and 270 are optional and may contribute to the accuracy of anomaly detection according to embodiments of the invention.

Some embodiments of the invention may combine a decision derived from the unsupervised machine learning algorithm of operation 230 and a decision tree classifier. In operation 230 events may be detected as normal or outliers. However, user feedback may mark an outlier event as a false positive, e.g., as a normal event. If an outlier event is marked as a false positive event, a decision tree classifier may generate a boundary to define in the multi-dimensional feature space a region of normal events around the false positive event. Thus, future events that will be located in the bounded region in the feature space may be classified in operation 230 as normal behavior and not as outliers, or the outlier probability of events in the bounded region may be adjusted, e.g., reduced. Thus, future false positive markings may be prevented. The combined algorithms may allow integration of user feedback and prior knowledge to improve the detection results.

Returning to the example in FIG. 4, in operation 230 the numbered events were detected as outliers. However, a user feedback marked event No. 8 as a false positive. Accordingly, a decision tree classifier has learned a boundary of a region of normal events around event No. 8, e.g., as marked on FIG. 4.

Reference is made to FIG. 12, showing a high-level block diagram of an exemplary computing device according to some embodiments of the present invention. Computing device 1200 may include a processor or controller 1205 that may be, for example, a central processing unit processor (CPU), a graphics processing unit (GPU), a chip or any suitable computing or computational device, an operating system 1215, a memory 1220, executable code 1225, storage or storage device 1230, input devices 1235 and output devices 1245. Controller 1205 may be configured to carry out methods described herein, and/or to execute or act as the various modules, units, etc., for example by executing code or software. More than one computing device 1200 may be included. Multiple processes discussed herein may be executed on the same controller. For example, server 110 presented in FIG. 1 may be implemented by one or more controllers 1205.

Operating system 1215 may be or may include any code segment (e.g., one similar to executable code 1225 described herein) designed and/or configured to perform tasks involving coordination, scheduling, arbitration, supervising, controlling or otherwise managing operation of computing device 1200, for example, scheduling execution of software programs or enabling software programs or other modules or units to communicate. Operating system 1215 may be a commercial operating system.

Memory 1220 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1220 may be or may include a plurality of, possibly different memory units. Memory 1220 may be a computer or processor non-transitory readable medium, or a computer non-transitory storage medium, e.g., a RAM.

Executable code 1225 may be any executable code, e.g., an application, a program, a process, task or script. Executable code 1225 may be executed by controller 1205 possibly under control of operating system 1215. For example, executable code 1225 may be an application that when executed detects anomalies for example in gaming or other patterns as further described herein. Although, for the sake of clarity, a single item of executable code 1225 is shown in FIG. 12, a system according to embodiments of the invention may include a plurality of executable code segments similar to executable code 1225 that may be loaded into memory 1220 and cause controller 1205 to carry out methods described herein. For example, units or modules described herein may be, or may include, controller 1205 and executable code 1225.

Storage device 1230 may be any applicable storage system, e.g., a disk or a virtual disk used by a VM. Storage 1230 may be or may include, for example, a hard disk drive, a floppy disk drive, a Compact Disk (CD) drive, a CD-Recordable (CD-R) drive, a Blu-ray disk (BD), a universal serial bus (USB) device or other suitable removable and/or fixed storage unit. Content or data may be stored in storage 1230 and may be loaded from storage 1230 into memory 1220 where it may be processed by controller 1205. In some embodiments, some of the components shown in FIG. 12 may be omitted. For example, memory 1220 may be a non-volatile memory having the storage capacity of storage 1230. Accordingly, although shown as a separate component, storage 1230 may be embedded or included in memory 1220.

Input devices 1235 may be or may include a mouse, a keyboard, a touch screen or pad or any suitable input device. It will be recognized that any suitable number of input devices may be operatively connected to computing device 1200 as shown by block 1235. Output devices 1245 may include one or more displays or monitors, speakers and/or any other suitable output devices. It will be recognized that any suitable number of output devices may be operatively connected to computing device 1200 as shown by block 1245. Any applicable input/output (I/O) devices may be connected to computing device 1200 as shown by input devices 1235 and output devices 1245. For example, a wired or wireless network interface card (NIC), a printer, a universal serial bus (USB) device or external hard drive may be included in input devices 1235 and/or output devices 1245.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 1220, computer-executable instructions such as executable code 1225 and a controller such as controller 1205.

The storage medium may include, but is not limited to, any type of disk including, semiconductor devices such as read-only memories (ROMs) and/or random access memories (RAMs), flash memories, electrically erasable programmable read-only memories (EEPROMs) or any type of media suitable for storing electronic instructions, including programmable storage devices. For example, in some embodiments, memory 1220 is a non-transitory machine-readable medium.

A system according to some embodiments of the invention may include components such as, but not limited to, a plurality of central processing units (CPU) or any other suitable multi-purpose or specific processors or controllers (e.g., controllers similar to controller 1205), a plurality of input units, a plurality of output units, a plurality of memory units, and a plurality of storage units. A system according to some embodiments of the invention may additionally include other suitable hardware components and/or software components. In some embodiments, a system may include or may be, for example, a personal computer, a desktop computer, a laptop computer, a workstation, a server computer, a network device, or any other suitable computing device. For example, a system according to some embodiments of the invention as described herein may include one or more devices such as computing device 1200.

Different embodiments are disclosed herein. Features of certain embodiments may be combined with features of other embodiments; thus, certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus, certain embodiments may be combinations of features of multiple embodiments.

What is claimed is:

1. A method for detecting anomalies in time series data related to online gaming patterns, the method comprising:
    obtaining by a processor, a time series data related to events of online gaming activities;
    extracting by the processor, event features of the events, wherein the event features comprise statistics on the time series data;
    detecting by the processor, outlier events in the time series data based on the event features;
    calculating by the processor, for a window, a set of window features based on the pattern and distribution of outlier events in the window;
    detecting by the processor, a suspected window in the time series data based on distribution of the window features;
    analyzing by the processor, a distribution of players inside the suspected window;
    determining by the processor, whether outlier events in the suspected window originate from one of a fraudulent event and an operational problem, based on the distribution of players; and
    providing by the processor, a notification to an operator of the online gaming activities in case the outlier events in the suspected window originate from one of the fraudulent event and the operational problem, wherein the notification comprises details of a suspected player if the outlier events in the suspected window originate from a fraudulent event.

2. The method of claim 1, wherein detecting the outlier events in the time series data comprises identifying outliers on a multi-dimensional feature space based on the event features using a machine learning algorithm.

3. The method of claim 1, wherein the outlier events are detected based on density of events in a multi-dimensional feature space.

4. The method of claim 1, wherein detecting the outlier events comprises:

defining an extent of time regarded as normal reference for future events;
calculating a normalized density estimation for each of the events inside this time scale;
assigning outlier probability for each of the events based on the normalized density estimation of the event; and
determining that an event is an outlier event if the outlier probability of the event exceeds an outlier threshold.

5. The method of claim 1, wherein detecting the suspected windows comprises:
modeling the window features by a generative model;
assigning an outlier confidence value for each of the windows based on the distribution of the window features relatively to the generative model; and
determining that a window is a suspected window if the outlier confidence value of the window exceeds a confidence threshold.

6. The method of claim 1, wherein analyzing the distribution of players inside the suspected windows comprises:
finding unique players inside the suspected windows based on player attributes; and
generating a unique player count histogram for each of the suspected windows by counting the number of outlier events associated with each of the unique players inside each of the suspected windows.

7. The method of claim 6, comprising:
determining whether the outlier events in a suspected window originate from one of a fraudulent event and an operational problem, based on the unique players count histogram.

8. The method of claim 7, wherein determining the origin of the outlier events in the suspected window comprises:
calculating a measure of variability of the unique players count histogram; and
determining that the outlier events in the suspected window originate from the fraudulent event if the measure of variability exceeds a variability threshold and that the outlier events in the suspected window originate from the operational problem otherwise.

9. The method of claim 1, comprising:
obtaining labeled outlier events, the label suggesting whether the labeled outlier event represents a fraudulent event; and
using the labeled outlier events to adjust parameters related to the detection of the outlier events and the detection of the suspected windows.

10. A method for detecting anomalies in online gaming patterns, the method comprising:
extracting by a processor, event features from a time series data related to events of online gaming activities;
calculating by the processor, a normalized density estimation for each of the events;
assigning by the processor, outlier probability for each of the events based on the normalized density estimation of the event;
determining by the processor, that an event is an outlier event if the outlier probability of the event is above an outlier threshold;
calculating by the processor, for a window of the time series data, a set of window features based on the outlier events in the window;
modeling by the processor, the window features by a generative model;
assigning by the processor, outlier confidence value for each of the suspected windows based on the distribution of the window features relatively to the generative model;
determining by the processor, that a window is a suspected window if the outlier confidence value of the window is above a confidence threshold;
finding by the processor, unique players inside the suspected windows based on player attributes;
generating by the processor, a unique player count histogram by counting the number of outlier events associated with each of the unique players inside each of the suspected windows;
calculating by the processor, a distribution metric of the unique players count histogram;
determining by the processor, that the outlier events in the suspected window originate from the fraudulent event if the distribution metric is above a unique players threshold and that the outlier events in the suspected window originate from the operational problem otherwise; and
providing by the processor, a notification to an operator of the online gaming activities in case the outlier events in the suspected window originate from one of the fraudulent event and the operational problem, wherein the notification comprises details of a suspected player if the outlier events in the suspected window originate from a fraudulent event.

11. The method of claim 10, comprising:
obtaining labeled outlier events, the label suggesting whether the labeled outlier event represents a true outlier event; and
adjusting parameters related to calculating the calculating the normalized density estimation, the outlier threshold, a length of the window, the confidence threshold and the unique players threshold, based on the labeled outlier events using machine learning classification methods.

12. A system for detecting anomalies in time series data related to online gaming patterns, the system comprising:
a memory; and
a processor configured to:
obtain a time series data related to events of online gaming activities;
extract event features of the events wherein the event features comprise statistics on the time series data;
detect outlier events in the time series data based on the event features;
calculate, for a window, a set of window features based on the pattern and distribution of outlier events in the window;
detect a suspected window in the time series data based on distribution of the window features;
analyze, a distribution of players inside the suspected window;
determine whether outlier events in the suspected window originate from one of a fraudulent event and an operational problem, based on the distribution of players; and
provide by the processor, a notification to an operator of the online gaming activities in case the outlier events in the suspected window originate from one of the fraudulent event and the operational problem, wherein the notification comprises details of a suspected player if the outlier events in the suspected window originate from a fraudulent event.

13. The system of claim 12, wherein the processor is configured to detect the outlier events in the time series data using a machine learning algorithm identify outliers on a multi-dimensional feature space based on the event features.

14. The system of claim 12, wherein the processor is configured to detect the outlier events based on density of events in a multi-dimensional feature space.

15. The system of claim 12, wherein the processor is configured to detect the outlier events by:
 defining an extent of time regarded as normal reference for future events
 calculating a normalized density estimation for each of the events inside this time scale;
 assigning outlier probability for each of the events based on the normalized density estimation of the event; and
 determining that an event is an outlier event if the outlier probability of the event exceeds an outlier threshold.

16. The system of claim 12, wherein the processor is configured to detect the suspected windows by:
 calculating, for each window, a set of window features based on the outlier events in the window;
 modeling the window features by a generative model;
 assigning an outlier confidence value for each of the windows based on the distribution of the window features relatively to the generative model; and
 determining that a window is a suspected window if the outlier confidence value of the window exceeds a confidence threshold.

17. The system of claim 12, wherein the processor is configured to analyze the distribution of players inside the suspected windows by:
 finding unique players inside the suspected windows based on player attributes; and
 generate a unique player count histogram for each of the suspected windows by counting the number of outlier events associated with each of the unique players inside each of the suspected windows.

18. The system of claim 17, wherein the processor is further configured to:
 determine whether the outlier events in a suspected window originate from one of a fraudulent event and an operational problem, based on the unique players count histogram.

19. The system of claim 18, wherein the processor is configured to determine the origin of the outlier events in the suspected window by:
 calculating a measure of variability of the unique players count histogram; and
 determining that the outlier events in the suspected window originate from the fraudulent event if the measure of variability exceeds a variability threshold; and determining that the outlier events in the suspected window originate from the operational problem if the measure of variability does not exceed a variability threshold.

20. The system of claim 12, wherein the processor is further configured to:
 obtain labeled outlier events, the label suggesting whether the labeled outlier event represents a fraudulent event; and
 use the labeled outlier events to adjust parameters related to the detection of the outlier events and the detection of the suspected windows.

* * * * *